United States Patent
Dewberry et al.

(10) Patent No.: US 9,751,513 B2
(45) Date of Patent: Sep. 5, 2017

(54) PARKING BRAKE RESET MECHANISM FOR RAILWAY VEHICLES

(71) Applicant: Wabtec Holding Corp., Wilmerding, PA (US)

(72) Inventors: James Thomas Dewberry, Greer, SC (US); Robert Norman Scharpf, Greenville, SC (US)

(73) Assignee: Wabtec Holding Corp., Wilmerding, PA (US)

(*) Notice: Subject to any disclaimer, the term of this patent is extended or adjusted under 35 U.S.C. 154(b) by 0 days.

(21) Appl. No.: 13/803,056

(22) Filed: Mar. 14, 2013

(65) Prior Publication Data

US 2014/0262640 A1    Sep. 18, 2014

(51) Int. Cl.

| | |
|---|---|
| *B60T 13/68* | (2006.01) |
| *B60T 15/60* | (2006.01) |
| *B61H 13/00* | (2006.01) |
| *B60T 13/26* | (2006.01) |
| *B60T 13/66* | (2006.01) |
| *B60T 17/22* | (2006.01) |

(52) U.S. Cl.
CPC ............ *B60T 15/60* (2013.01); *B60T 13/266* (2013.01); *B60T 13/665* (2013.01); *B60T 17/228* (2013.01); *B61H 13/005* (2013.01)

(58) Field of Classification Search
CPC .... B60T 13/005; B60T 13/266; B60T 13/665; B60T 17/228
USPC ........ 303/7, 25–29, 39, 40, 81–83, 128, 127
See application file for complete search history.

(56) References Cited

U.S. PATENT DOCUMENTS

| | | | | |
|---|---|---|---|---|
| 5,152,410 | A * | 10/1992 | Ta et al. ........................ | 213/212 |
| 5,241,819 | A * | 9/1993 | Ta .................................. | 60/325 |
| 5,494,342 | A * | 2/1996 | Engle .................... | B60T 13/665 303/15 |
| 8,190,311 | B2 * | 5/2012 | Smith ................... | B60T 13/665 188/3 H |

* cited by examiner

Primary Examiner — Christopher Schwartz
(74) Attorney, Agent, or Firm — The Webb Law Firm

(57) ABSTRACT

A parking brake reset system for a railway vehicle, such as a transit vehicle, includes a brake operating unit fluidly connected to a main air reservoir and controlling air flow to a brake cylinder of the railway vehicle, a brake pipe, a parking brake, and a control valve in line between the brake pipe and the parking brake to establish fluid communication between the brake pipe and the parking brake. The control valve is in line between the brake operating unit and the parking brake, whereby the control valve controls air flow to the parking brake from the main air reservoir and the brake pipe. The control valve may be a double check valve or a 3-way cutout valve, as examples.

18 Claims, 4 Drawing Sheets

PARKING BRAKE RESET MECHANISM FOR RAILWAY VEHICLES

BACKGROUND OF THE INVENTION

Field of the Invention

This disclosure relates generally to a parking brake reset system for a railway vehicle, and more particularly, to a parking brake reset mechanism for a transit vehicle.

Description of Related Art

Currently known parking brake systems utilized in many transit vehicles are equipped with spring-applied air release parking brakes. This provides automatic application of the parking brakes whenever the parking brake system air pressure is lost. However, when transit vehicles are equipped with this type of parking brake system, the parking brakes must be manually released in order to move a disabled transit vehicle to a new location for repair. Manually releasing the parking brakes allows the transit vehicle to roll freely for the move to, for example, a repair station but, once arriving at the desired destination, the parking brakes are no longer available to prevent motion of the transit vehicle once parked.

In order to reset the parking brakes of the disabled transit vehicle, pressurized air must be applied to the parking brakes to a sufficient level to allow the spring mechanism to re-engage. Currently, two different methods are used to reset the parking brakes of the disabled transit vehicle before or upon arriving at the desired destination. The first method includes onboard storage of a small volume of pressurized air necessary to perform a local reset of the parking brakes. Referring to FIG. 1, a prior art parking brake reset system is shown. The system utilizes a sufficient amount of pressurized air, which is stored on the transit vehicle, to re-pressurize the parking brake following manual release of parking brakes. During the normal operation of the railway vehicle system, a main air reservoir 100 distributes pressurized air through a distribution pipe 110 to a control valve 130. A brake operating unit 120 is fluidly connected to the main air reservoir 100 and controls the air flow to a brake cylinder 150 of a parking brake unit 160, which also includes a parking brake 140. When the pressurized air from the main air reservoir 100 flows through the control valve 130, the control valve 130 will shuttle to a position which allows the pressurized air to flow to the parking brake 140. The brake cylinder 150 and the parking brake 140 may also be fluidly connected to additional parking brake units (not shown) on the transit vehicle. The pressurized air engages with the parking brake 140 and will hold the parking brake 140 off to allow the railway vehicle system to move freely. Pressurized air from the main air reservoir 100 is also fed via a check valve 185 to a parking brake reset reservoir 190.

However, during a failure situation where the railway vehicle system loses pressurized air and the parking brake 140 has been manually released, the parking brake system must be reset before the parking brake can be applied on the disabled railway vehicle. In the system shown in FIG. 1, the parking brake reset system is re-pressurized by moving a parking brake reset valve 195 to the position which connects air from the parking brake reset reservoir 190 to the parking brake 140 via the control valve 130 to re-pressurize and reset the parking brake 140 of the disabled transit vehicle. The spring loaded parking brake reset valve 195 is then released and allowed to move to its normal position. In the normal position, the parking brake air is vented to atmosphere and the parking brake 140 reapplies to prevent movement of the transit vehicle. The sole source of re-pressurization in the foregoing method is provided by the pressurized air that is stored on each transit vehicle.

Additionally, the foregoing method is primarily implemented on the transit vehicles of the railway system vehicle to reduce the amount of equipment that is stored on each individual transit vehicle. However, by only resetting the parking brakes of each individual transit vehicle, the grade holding capacities of the parking brake reset systems are greatly reduced. This requires an operator to ensure that all of the transit vehicles' parking brakes have been reset to provide the greatest grade holding capacity possible. This involves resetting the parking brakes of each individual transit vehicle, which can increase the amount of time needed to reset the parking brake systems. This method of resetting the parking brake systems for transit vehicles involves extra equipment and increased periods of time to reset the parking brake systems.

Referring to FIG. 2, an additional prior art parking brake reset mechanism is shown. The system requires a disabled transit vehicle 330 to cross-connect with a rescue transit vehicle 320 via a plurality of hoses 280 which are stored on the transit vehicles 320, 330. By cross-connecting the hoses 280 of the transit vehicles 320, 330, the parking brake reset system of the disabled transit vehicle 330 is re-pressurized using pressurized air from the rescue transit vehicle 320. During the normal operation of the railway vehicle system, a main air reservoir 200 distributes pressurized air through a brake operating unit 220. The brake operating unit 220 controls the air flow directed to a brake cylinder 240 of a parking brake unit 250, which also includes a parking brake 230. The pressurized air flows to the parking brake 230 as well. The brake cylinder 240 and the parking brake 230 may also be fluidly connected to additional parking brake units (not shown) on the transit. The pressurized air engages with the parking brake 230 which holds off the parking brake 230 while the transit vehicle 330 is moving freely.

However, during a failure situation where the system pressure of the transit vehicle 330 is lost, the parking brake 230 is manually released to keep the transit vehicle 330 from moving freely until the system pressure is restored. In this system, the pressurized air of another transit vehicle 320 is used to re-pressurize the disabled transit vehicle 330. An operator can connect the male end 290 of the hose 280 of the rescue transit vehicle 320 into a female end of a pneumatic valve 270 on the disabled transit vehicle 330. A vented cutout valve 300 on the rescue transit vehicle 320 is opened to allow the pressurized air from the main air reservoir 310 to flow through the hose 280. A vented cutout valve 260 is also opened on the disabled transit vehicle 330. The pressurized air can then flow through the hose 280, through the vented cutout valve 260, and into the main air reservoir 200 of the disabled transit vehicle 330.

This railway vehicle system requires the entire main air reservoir 200 of the disabled transit vehicle 330 to be filled to reset the parking brake reset system. The refill of the main air reservoir 200 can take an extended period of time, quite often ranging between 30 and 45 minutes, as the sole source of re-pressurization is provided by the main air reservoir 310 of the rescue transit vehicle 320.

SUMMARY OF THE INVENTION

There is a current need for a parking brake reset system that can be reset without the need for additional equipment and with a faster reset time.

In one embodiment, a parking brake reset system for a railway vehicle, such as a transit vehicle, includes a brake operating unit fluidly connected to a main air reservoir and controlling air flow to a brake cylinder of the railway vehicle, a brake pipe, a parking brake, and a control valve in line between the brake pipe of the parking brake to establish fluid communication between the brake pipe and the parking brake. The control valve is in line between the brake operating unit and the parking brake, whereby the control valve controls air flow to the parking brake from the main air reservoir and the brake pipe. The control valve may be a double check valve or a 3-way cutout valve, as examples.

A pressure measurement port may be fluidly connected in line between the brake pipe and the control valve. A pressure gauge may be connected to the pressure measurement port. A quick disconnect unit may be positioned in line with the pressure measurement port. The brake pipe may be adapted for connection to a brake pipe of another railway vehicle. The brake pipe may be adapted for connection to a brake pipe of another railway vehicle via a tappet valve. A brake pipe isolation valve may be positioned in line with the tappet valve. A quick disconnect unit may be adapted for connection to a quick disconnect unit of another railway vehicle.

Further details and advantages will be understood from the following detailed description read in conjunction with the accompanying drawing.

DESCRIPTION OF THE PREFERRED EMBODIMENTS

For purposes of the description hereinafter, spatial orientation terms, as used, shall relate to the referenced embodiment as it is oriented in the accompanying drawings, figures, or otherwise described in the following detailed description. However, it is to be understood that the embodiments described hereinafter may assume many alternative variations and configurations. It is also to be understood that the specific components, devices, features, and operational sequences illustrated in the accompanying drawing, figures, or otherwise described herein are simply exemplary and should not be considered as limiting. In the following description, like parts are designated with like numerals with a prime associated with the numerals designating an opposing railway vehicle.

Figure 3:
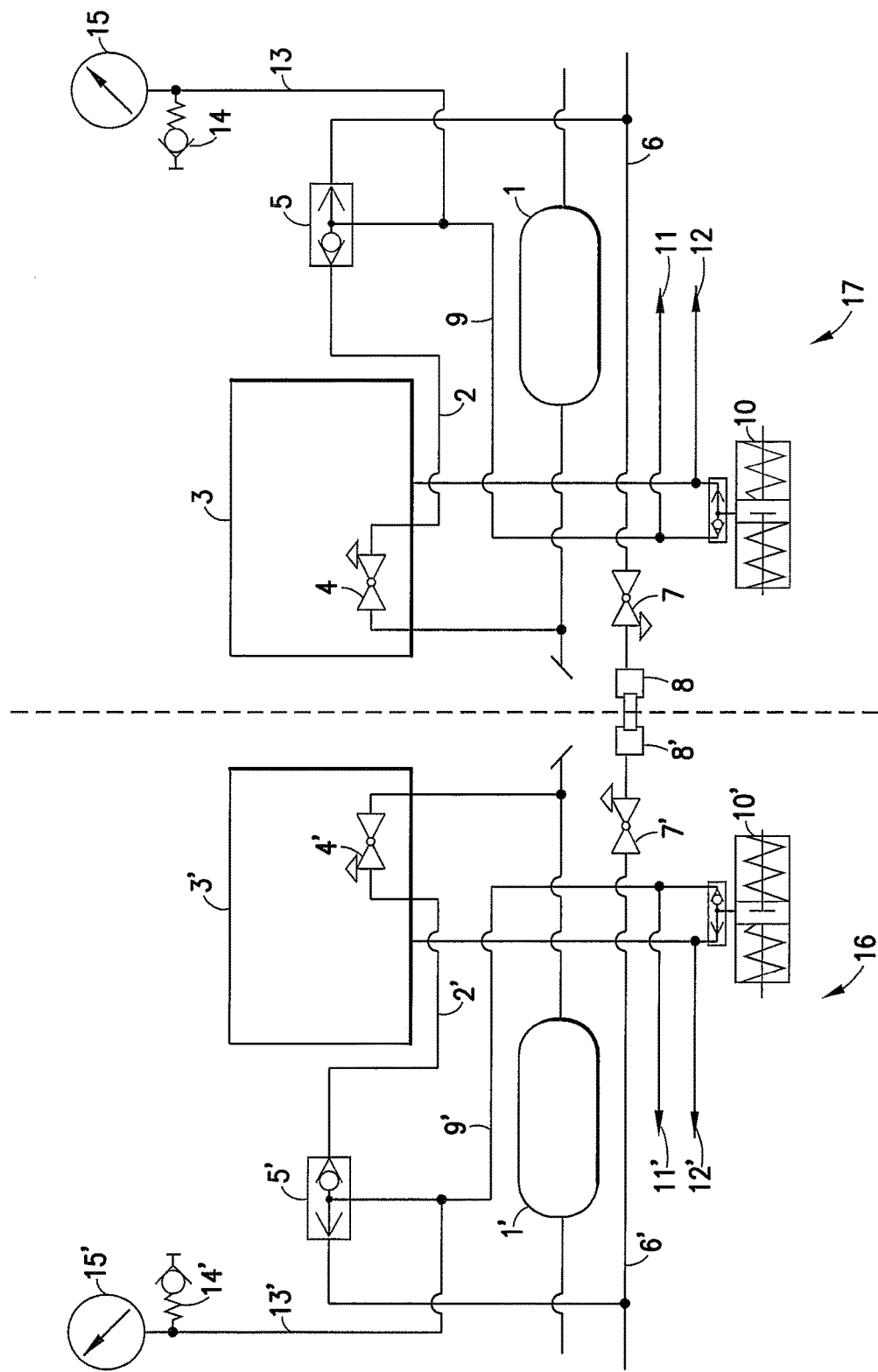
FIG. 3 is a schematic drawing of a railway vehicle system including parking brake reset mechanisms in accordance with this disclosure.

Referring to FIG. 3, a parking brake reset system for a railway vehicle, such as a transit vehicle, is described herein. A main air reservoir 1 is fluidly connected to a control valve 5 via a reservoir distribution pipe 2. The main air reservoir 1 provides pressurized air to the parking brake reset system of a transit vehicle 17. A brake operating unit 3 is positioned in line with reservoir distribution pipe 2. The brake operating unit 3 includes a parking brake isolation valve 4, which allows pressurized air to pass therethrough during normal operation of the transit vehicle. The brake operating unit 3 controls the pressurized air flow to a brake cylinder 12 of a parking brake unit 10, which also includes a parking brake 11. The parking brake 11 and the brake cylinder 12 may also be fluidly connected to additional parking brake units (not shown) on the transit vehicle 17. Pressurized air from the main air reservoir 1 passes through the brake operating unit 3, which is used to regulate the pressurized air flow that is directed to the brake cylinder 12 and the control valve 5. The parking brake isolation valve 4 can be opened or closed to control where and how much of the pressurized air from the main air reservoir 1 is used in the parking brake reset system.

The control valve 5 operates to ensure that the pressurized air is being directed through the parking brake reset system according to what type of condition the transit vehicle 17 is operating under. The transit vehicle 17 usually operates in two different conditions, however, additional conditions may be contemplated. These conditions include a normal operating condition and a failure operating condition when the parking brake reset system of the transit vehicle 17 loses all air pressure. In the normal operating condition, the pressurized air used to hold off the parking brake 11 is directed from the main air reservoir 1 to the parking brake 11 via the control valve 5. During the failure operating condition, the parking brake 11 is automatically engaged to hold the transit vehicle 17 once the transit vehicle 17 has lost all parking brake system pressure. In this operating condition, pressurized air is obtained from a transit vehicle 16 operating under normal condition to reset the parking brake 11.

Figure 4:
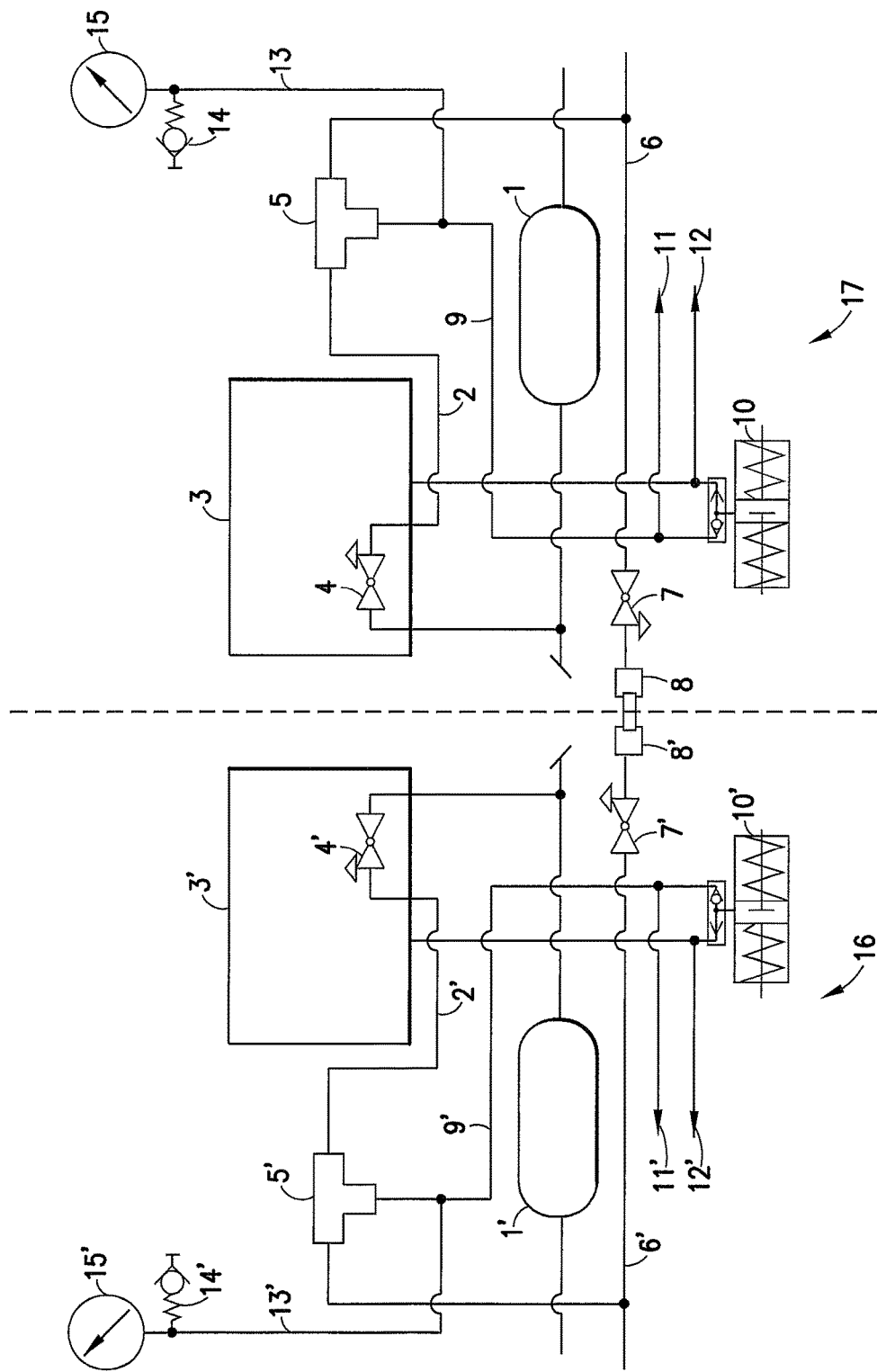
FIG. 4 is a schematic drawing of another railway vehicle system including parking brake reset mechanisms in accordance with this disclosure.

In one embodiment, the control valve 5 is a double check valve. When a double check valve is used with the parking brake reset system, pressurized air is permitted to flow from the main air reservoir 1 through the control valve 5 to the parking brake 11 via a parking brake feed pipe 9. When pressurized air is directed to the parking brake 11, the parking brake 11 is held off and remains disengaged. Referring to FIG. 4, in another embodiment the control valve 5 is a 3-way cutout valve. When the 3-way cutout valve is used with the parking brake reset system, additional user operation is required compared to the use of the double check valve. When resetting the parking brake 11 of the parking brake reset system, the operator must manually turn each of the desired valves on each transit vehicle to properly ensure that the pressurized air flows to the parking brake 11 and not back into the main air reservoir 1. This requires the operator to move the 3-way cutout valve to block the main air reservoir 1 and connect the brake pipe 6 and the parking brake feed pipe 9, thereby allowing the pressurized air to enter the 3-way cutout valve from the brake pipe 6 and exit the 3-way cutout valve to the parking brake feed pipe 9.

The control valve 5 is also fluidly connected to a brake pipe 6. A tappet valve 8 is positioned on the opposite end of the brake pipe 6. The tappet valve 8 enables the transit vehicle 17 to connect to a similar parking brake reset system of a different transit vehicle 16. The tappet valve provides a connection to a similar tappet valve on a brake pipe of another transit vehicle 16. Pressurized air is directed from the brake pipe 6☐ of the additional transit vehicle 16 through the tappet valve 8' and into the brake pipe 6 of the disabled transit vehicle 17. The brake pipe 6 includes a brake pipe isolation valve 7 which can be opened or closed by the operator to allow pressurized air to enter the parking brake reset system through the tappet valve 8 connected to the additional transit vehicle 16 or to prevent pressurized air from entering the transit vehicle 17 when the transit vehicle 17 is being moved while connected to the transit vehicle 16 operating under normal condition. By closing the brake isolation valve 7, the operator can ensure that the transit vehicle 16 operating under normal condition does not re-pressurize the disabled transit vehicle 17 and re-engage the parking brake 11 of the disabled transit vehicle 17 when moving the disabled transit vehicle 17.

The control valve 5 is also fluidly connected to a parking brake unit 10 and the brake operating unit 3 via the parking brake feed pipe 9. In one embodiment, the parking brake unit 10 is a tread brake unit with a spring-applied parking brake. This tread brake unit includes a brake pad or block that is applied against the tread of a wheel on the transit vehicle 17. A spring is used to press the brake pad or block against the tread of the wheel to apply a friction force to the wheel, resulting in the wheel's motion being stopped. The tread brake unit provides a more compact and lightweight structure compared to conventional braking units. The tread brake unit also allows for easier maintenance, provides an anti-noise solution, and stabilizes brake efficiency. The parking brake 11 is fluidly connected to the parking brake feed pipe 9. Pressurized air directed from the main air reservoir 1 through the control valve 5 keeps the parking brake 11 held-off. However, when the pressurized air is lost in the parking brake reset system, the parking brake unit 10 may be manually released to allow movement of the transit vehicle.

An optional pressure measurement port 15 is fluidly connected with the parking brake feed pipe 9 via a pressure measurement port feed pipe 13 to allow the operator to measure the air pressure level of the parking brake reset system. The pressure measurement port 15 is optionally adapted to connect to a pressure gauge, thereby allowing the operator to ascertain a reading of the air pressure level of the parking brake reset system, if desired. Thus, the operator can, if desired, ensure that the parking brake reset system does not reach excessive levels during operation of the parking brake reset system. Whenever the transit vehicle 17 is stopped, the operator can, if desired, monitor the air pressure level of the parking brake reset system during normal operation of the transit vehicle 17. Thus, the operator can be notified of any leaks in the parking brake reset system that would cause a drop in the air pressure level before there is a total loss of system pressure. The operator can fix the leak or faulty connection before additional pressurized air of the parking brake reset system is lost, or the operator can move the transit vehicle 17 to, for example, the closest repair station. By fluidly connecting the pressure measurement port 15 with the parking brake feed pipe 9, the parking brake reset system pressure can be gauged prior to the pressurized air flowing to the parking brake unit 10 and parking brake 11.

A quick disconnect unit 14 is also fluidly connected with the parking brake feed pipe 9 via the pressure measurement port feed pipe 13. This quick disconnect unit 14 provides an alternative means of resetting the parking brake reset system of the transit vehicle 17 whenever a transit vehicle 16 operating under normal condition is unable to connect to the disabled transit vehicle 17 to re-pressurize the parking brake reset system via the tappet valves 8, 8'. As can often occur, the disabled transit vehicle 17 may be connected to a locomotive or another type of transit vehicle that includes a different parking brake reset system or means than the one equipped on the disabled transit vehicle 17. By providing a quick disconnect unit 14 on the disabled transit vehicle 17, an operator can still re-pressurize the parking brake reset system through an alternative means. The quick disconnect unit 14 includes a quick disconnect valve and hose (not shown) to connect to a locomotive or transit vehicle that does not have a tappet valve which the disabled transit vehicle 17 can make a connection. By directing pressurized air into the quick disconnect unit 14, the pressurized air flows through the pressure measurement port feed pipe 13 and the parking brake feed pipe 9 to re-pressurize the parking brake 11. When connected to a locomotive or another transit vehicle without a tappet valve connection on a brake pipe, the quick disconnect unit 14 operates to release to the atmosphere as little of the pressurized air as possible. Upon connection of the quick disconnect hose, pressurized air is quickly directed through the hose to the disabled transit vehicle 17. The quick disconnect unit 14 shuts off the air flow the instant the connection is broken. In one embodiment, inside each of the quick disconnect units 14, 14' is a spring-mounted valve that keeps each connection airway closed until engaged with another connector valve.

In another embodiment, a railway vehicle system includes at least two transit vehicles 16, 17 whose parking brake reset systems are operatively connected by a tappet valve 8 placed on the end of the brake pipes 6, 6' of each transit vehicle 16, 17. Multiple transit vehicles 16, 17 can be connected together to provide more passenger and load space. By linking multiple transit vehicles 16, 17 together, an operator has multiple air reservoirs which can be used upon a transit vehicle 17 losing total parking brake reset system pressure. In one embodiment, the transit vehicles 16, 17 are mechanically coupled together to provide a secure connection when travelling, but additional connections are contemplated, such as magnetic connections. By connecting multiple transit vehicles 16, 17 together, if one transit vehicle 17 loses parking brake reset system pressure, the transit vehicle 16 operating under normal condition connected to the disabled transit vehicle 17 can transfer pressurized air to the disabled transit vehicle's 17 parking brake reset system. The operation of resetting the parking brake reset system in the disabled transit vehicle 17 is explained with more detail below. In one embodiment, each transit vehicle that is connected in the railway vehicle system includes a parking brake reset system as described in detail hereinabove. Each parking brake reset system in the railway vehicle system operates in the same manner, providing uniformity to the parking brake reset system and ease of repair if one of the parking brake reset systems is damaged.

During normal operation of the transit vehicle 17, pressurized air is directed from the main air reservoir 1 to the control valve 5 via the reservoir distribution pipe 2. The control valve 5 is shuttled to a position to allow the pressurized air to flow into the parking brake feed pipe 9 and towards the parking brake 11. A shuttle housed within the control valve 5 is pushed by the pressurized air to an opposite side of the control valve 5 from which the pressurized air is entering. By continually providing pressurized air from the main air reservoir 1, the control valve 5 is kept at the desired position. Through the operation of the brake operating unit 3, a portion of the pressurized air is directed to the brake cylinder 12. By directing pressurized air through the parking brake 11, the pressurized air pushes against the spring of the parking brake 11, which holds off the parking brake 11. The spring of the parking brake 11 presses the brake pad or block of the parking brake unit 10 against the wheels to prevent motion of the wheels.

Figure 1:
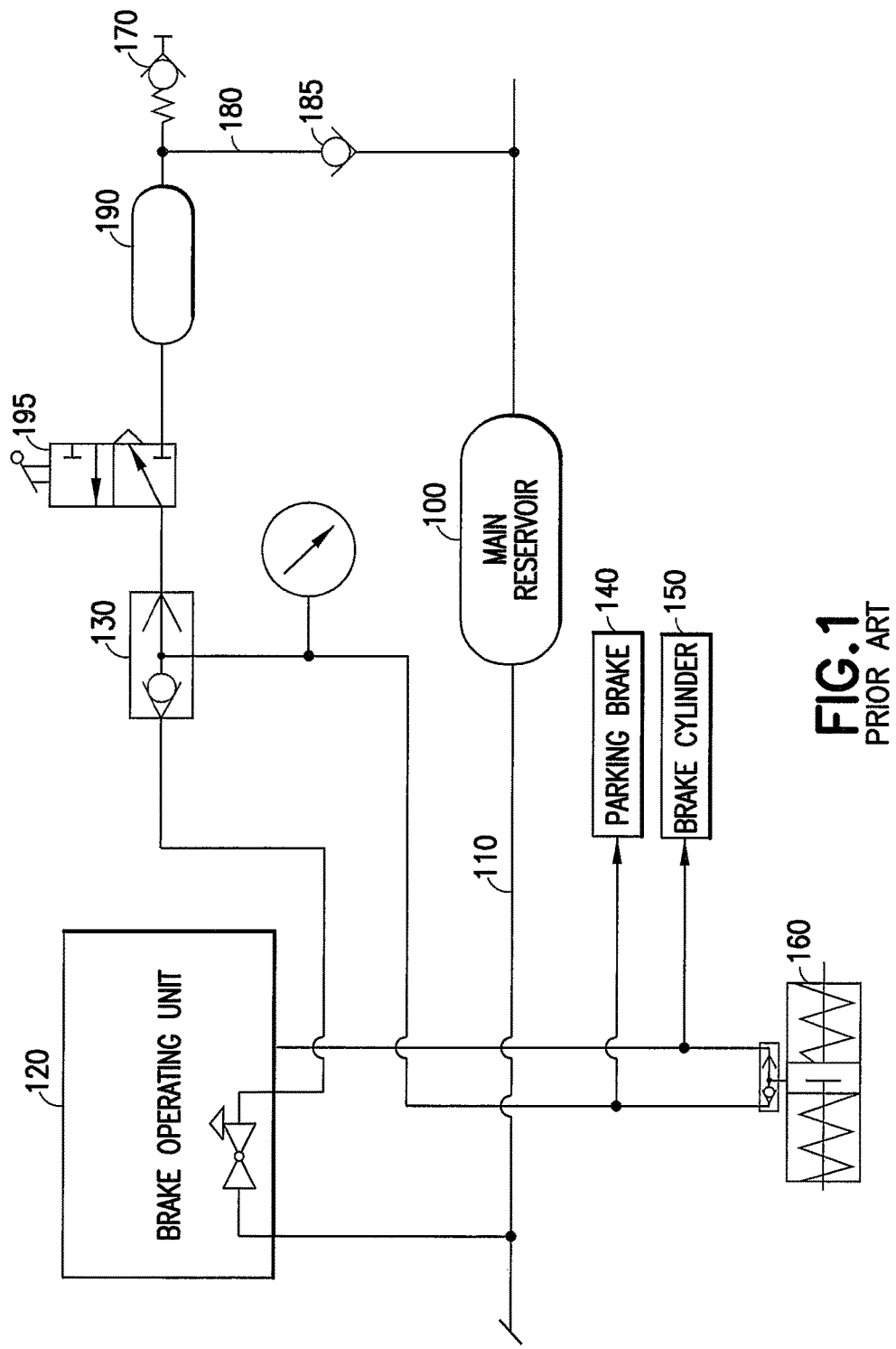
FIG. 1 is a schematic drawing of a prior art railway vehicle system including a parking brake reset mechanism.
Figure 2:
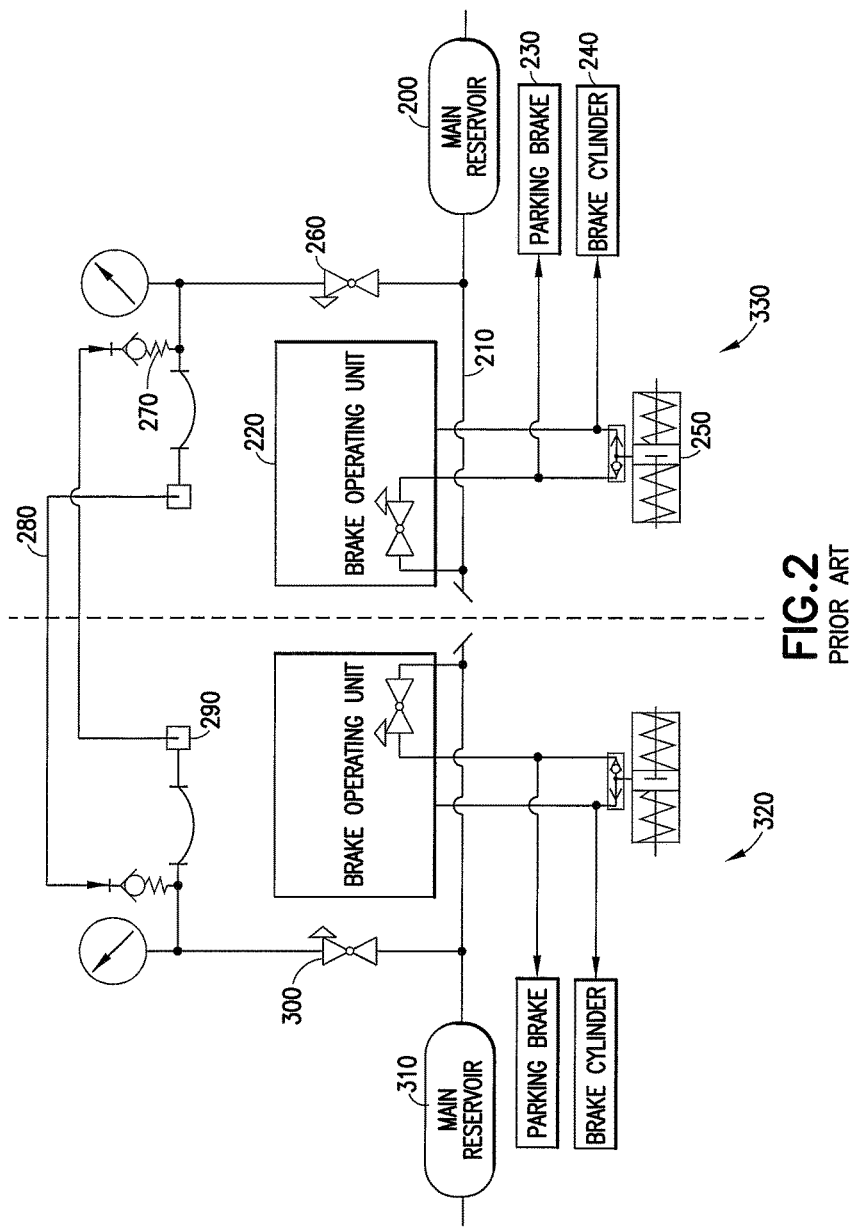
FIG. 2 is a schematic drawing of an additional prior art railway vehicle system including a parking brake reset mechanism.

During a failure operation of the transit vehicle 17, however, the parking brake reset system pressure may be lost at which point the parking brake 11 is automatically applied to prohibit the disabled transit vehicle 17 from moving any further. At this point, the operator must either move the disabled transit vehicle 17 to, for example, a repair station to re-pressurize the parking brake reset system or re-pressurize the disabled transit vehicle's 17 parking brake reset system at the current location that the transit vehicle 17 has been stopped. By using the operation described herein, the operator can avoid using the prior art methods for re-pressurizing the parking brake reset system, as described previously in connection with FIGS. 1-2, and can decrease the amount of time needed to condition the transit vehicle for parking. By connecting the disabled transit vehicle 17 to a transit vehicle 16 operating under normal condition through the tappet valves 8, 8' of each brake pipe 6, 6', pressurized air from the transit vehicle 16 operating under normal condition can be directed to the disabled transit vehicle 17. This connection avoids the need to store an individual hose system on both the disabled transit vehicle 17 and the transit vehicle 16 operating under normal condition in order to refill the main air reservoir 1 of the disabled transit vehicle 17. This connection also avoids the need to store onboard the disabled transit vehicle 17 a volume of air necessary to perform a local reset of the parking brake reset system.

In the event the disabled transit vehicle 17 needs to be moved to, for example, a repair station or to another location where the operator can re-pressurize the parking brake reset system, the parking brake 11 is manually released to permit the operator to move the transit vehicle 17 along the rail to the desired destination. Prior to moving the disabled transit vehicle 17, the brake pipe isolation valve 7 is closed to prevent unintentional side effects of the connection between the disabled transit vehicle 17 and the transit vehicle 16 operating under normal condition. These unintentional side effects include, among others, the disabled transit vehicle's 17 parking brake 11 becoming re-pressurized and re-engaged during the transportation of the disabled transit vehicle 17 to a new destination. This reengagement would cause the railway vehicle system to immediately stop, potentially resulting in extensive damage to the disabled transit vehicle 17 along with the remaining vehicles connected thereon. The disabled transit vehicle's 17 brake pipe 6 is then connected, via the tappet valves 8, 8', to the brake pipe 6' of the transit vehicle 16 operating under normal condition. In this embodiment, the transit vehicle 16 operating under normal condition is positioned ahead of the disabled transit vehicle 17 to pull the disabled transit vehicle 17 along the rails.

Upon arriving at the desired destination, the parking brake reset system of the disabled transit vehicle 17 must be re-pressurized to reset the parking brake 11. The transit vehicle 16 operating under normal condition keeps the disabled transit vehicle 17 immobile, thereby avoiding the need to use the inactive parking brake 11 of the disabled transit vehicle 17. At this point, the operator opens the brake pipe isolation valve 7 on the disabled transit vehicle 17, which allows the transit vehicle 16 operating under normal condition to re-pressurize the parking brake reset system of the disabled transit vehicle 17. Pressurized air is directed from the transit vehicle 16 operating under normal condition through the tappet valves 8, 8☐ to the disabled transit vehicle 17. The pressurized air flows through the brake pipe 6 to the control valve 5 of the disabled transit vehicle 17. The control valve 5 then shuttles to a position to allow the pressurized air to flow through the parking brake feed pipe 9 to re-pressurize the parking brake 11. In one embodiment, a stop member (not shown) may need to be used when re-pressurizing the disabled transit vehicle 17 to prevent venting of the pressurized air out of the brake pipe 6 of the disabled transit vehicle 17. The stop member may be a plug, a cutout cock, or any other object that creates a seal on the brake pipe 6 of the disabled transit vehicle 17 to prevent the pressurized air from escaping the brake pipe 6. By using the stop member, a more efficient use of the pressurized air can be attained. It also ensures the continued integrity of the brake pipe 6 by directing the pressurized air through the brake pipe 6 at a more consistent and continuous flow, instead of allowing the pressurized air to exit from holes or leaks in the brake pipe 6, causing breakage of the brake pipe 6.

As the parking brake reset system of the disabled transit vehicle 17 is being re-pressurized, the operator can monitor the air pressure level of the parking brake reset system by using the pressure measurement port 15. A pressure gauge can be connected to the pressure measurement port 15 to evaluate whether the disabled transit vehicle's 17 parking brake reset system has attained the proper pressure levels to ensure safe operation of the disabled transit vehicle 17. Once the desired pressure level for the disabled transit vehicle 17 is attained, any excess brake pipe pressure is released and the transit vehicle 16 operating under normal condition is disengaged. The brake pipe isolation valve 7 is closed on both transit vehicles 16, 17 to prevent any pressurized air from escaping inadvertently to the atmosphere. At this point, the disabled transit vehicle 17 has the necessary parking brake reset system pressure to allow the parking brake 11 to reset. Once reset, the parking brake 11 can be vented, thereby engaging and holding the disabled transit vehicle 17 in place.

Situations may arise, however, where an operator cannot connect the disabled transit vehicle's 17 brake pipe 6 to the brake pipe of another vehicle. The operator, however, has another option to re-pressurize the disabled parking brake reset system. The disabled transit vehicle 17 also includes the quick disconnect unit 14 to re-pressurize the parking brake reset system. The quick disconnect unit 14 can be used to connect to the main air reservoir of among others, a locomotive or another transit vehicle that does not include a tappet valve to connect to the disabled transit vehicle 17. Pressurized air from the vehicle operating under normal condition can be used to re-pressurize the disabled transit vehicle 17. The quick disconnect unit 14 includes a hose and connection valve (not shown) used for connecting to a similar quick disconnect unit on another vehicle. By directing pressurized air from the rescue vehicle to the disabled transit vehicle 17, the parking brake 11 can be re-pressurized and re-engaged. The pressurized air from the rescue vehicle enters through the quick disconnect connection valve and is directed through the pressure measurement port feed pipe 13. The pressurized air then enters the parking brake feed pipe 9 and, finally, the parking brake 11. By using a quick disconnect unit 14, the operator is not stranded with limited options when the parking brake reset system pressure is lost. When using a transit vehicle with multiple options for re-pressurizing the parking brake reset system, more freedom can be used in deciding which vehicles will be connected to form a railway vehicle system.

While an embodiment of a parking brake reset mechanism for a railway vehicle is shown in the accompanying figure and described hereinabove in detail, other embodiments will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A parking brake reset system for a railway vehicle, comprising:
   a brake pipe;
   a parking brake; and
   a control valve in line between the brake pipe and the parking brake to establish fluid communication between the brake pipe and the parking brake,
   wherein the brake pipe is adapted for connection to a brake pipe of another railway vehicle so the brake pipe of the another railway vehicle can re-pressurize the parking brake of the railway vehicle, and
   wherein pressurized fluid from the another railway vehicle flows directly from the brake pipe of the another railway vehicle to the parking brake of the railway vehicle through the control valve.

2. The parking brake reset system as claimed in claim 1, further comprising a pressure measurement port fluidly connected in line between the brake pipe and the control valve.

3. The parking brake reset system as claimed in claim 2, further comprising a quick disconnect unit positioned in line with the pressure measurement port.

4. The parking brake reset system as claimed in claim 3, wherein the quick disconnect unit is adapted for connection to a quick disconnect unit of another railway vehicle.

5. The parking brake reset system as claimed in claim 2, further comprising a pressure gauge connected to the pressure measurement port.

6. The parking brake reset system as claimed in claim 1, wherein the brake pipe is adapted for connection to a brake pipe of another railway vehicle via a tappet valve.

7. The parking brake reset system as claimed in claim 6, further comprising a brake pipe isolation valve positioned in line with the tappet valve.

8. The parking brake reset system as claimed in claim 1, wherein the control valve comprises a double check valve.

9. The parking brake reset system as claimed in claim 1, wherein the control valve comprises a 3-way cutout valve.

10. A parking brake reset system for a railway vehicle, comprising:
    a brake operating unit fluidly connected to a main air reservoir and controlling air flow to a brake cylinder of the railway vehicle;
    a brake pipe;
    a parking brake; and
    a control valve in line between the brake pipe and the parking brake; and;
    wherein the control valve is in line between the brake operating unit and the parking brake to establish fluid communication between the brake pipe and the parking brake, whereby the control valve controls air flow to the parking brake from the main air reservoir and the brake pipe,
    wherein the brake pipe is adapted for connection to a brake pipe of another railway vehicle so the brake pipe of the another railway vehicle can re-pressurize the parking brake of the railway vehicle, and
    wherein pressurized fluid from the another railway vehicle flows directly from the brake pipe of the another railway vehicle to the parking brake of the railway vehicle through the control valve.

11. The parking brake reset system as claimed in claim 10, further comprising a pressure measurement port fluidly connected in line between the brake pipe and the control valve.

12. The parking brake reset system as claimed in claim 11, further comprising a quick disconnect unit positioned in line with the pressure measurement port.

13. The parking brake reset system as claimed in claim 12, wherein the quick disconnect unit is adapted for connection to a quick disconnect unit of another railway vehicle.

14. The parking brake reset system as claimed in claim 11, further comprising a pressure gauge connected to the pressure measurement port.

15. The parking brake reset system as claimed in claim 10, wherein the brake pipe is adapted for connection to a brake pipe of another railway vehicle via a tappet valve.

16. The parking brake reset system as claimed in claim 15, further comprising a brake pipe isolation valve positioned in line with the tappet valve.

17. The parking brake reset system as claimed in claim 10, wherein the control valve comprises a double check valve.

18. The parking brake reset system as claimed in claim 10, wherein the control valve comprises a 3-way cutout valve.

* * * * *